(12) United States Patent
Roy et al.

(10) Patent No.: US 6,319,405 B1
(45) Date of Patent: Nov. 20, 2001

(54) WASTEWATER DISPOSAL SYSTEM

(76) Inventors: Guy W. Roy, 596 Indian Home Rd., Danville, CA (US) 94526; Harvey I. Scudder, 7409 Hansen Dr., Dublin, CA (US) 94568

(*) Notice: Subject to any disclaimer, the term of this patent is extended or adjusted under 35 U.S.C. 154(b) by 0 days.

(21) Appl. No.: 09/533,444

(22) Filed: Mar. 23, 2000

(51) Int. Cl.⁷ .................................................. C02F 3/32
(52) U.S. Cl. ..................... 210/602; 210/747; 210/143; 210/170
(58) Field of Search .................................. 210/602, 747, 210/143, 170

(56) References Cited

U.S. PATENT DOCUMENTS

| | | |
|---|---|---|
| 2,382,010 | 8/1945 | Hodges . |
| 4,235,561 | 11/1980 | Peterson . |
| 4,839,051 | 6/1989 | Higa . |
| 4,908,129 | 3/1990 | Finsterwalder et al. . |
| 4,995,969 | 2/1991 | LaVigue . |
| 5,273,653 | 12/1993 | Kickuth . |
| 5,632,896 | 5/1997 | Vandervelde et al. . |

*Primary Examiner*—Chester T. Barry
(74) *Attorney, Agent, or Firm*—Thomas R. Lampe

(57) ABSTRACT

A wastewater disposal system in which wastewater is transported to an elevated site on a hill, distributed along a predetermined width of the hillside and allowed to flow down the hillside under the influence of gravity. The rate of distribution of wastewater is controlled so that it does not completely penetrate the hill and does not accumulate to any significant degree at the hill bottom. Beneficial uses of the wastewater are disclosed, as is treatment of the wastewater, both biological and phyto treatment.

24 Claims, 3 Drawing Sheets

WASTEWATER DISPOSAL SYSTEM

TECHNICAL FIELD

This invention relates to a method and an apparatus for disposing of wastewater. The invention has particular application to the disposal of treated or secondary effluent; however, it is applicable to other types of wastewater.

BACKGROUND OF THE INVENTION

Many municipal waste treatment plants are at capacity and need to be expanded. Some plants are deteriorated and provide sub-standard treatment. Disposal of treated effluent is a constant problem.

As will be described in greater detail below the invention disclosed and claimed herein provides an economical solution to the problem of disposing of treated effluents and other types of wastewater. In addition, disposal is employed in a beneficial manner and can be utilized to achieve a positive end result, namely continuous formation of lush vegetation on unused or under-used terrain which may be utilized, for example, to feed grazing animals such as cattle.

A search of the prior art located the following United States patents which disclose schemes for treatment of wastewater in some manner: U.S. Pat. No. 4,839,051, issued Jun. 13, 1989, U.S. Pat. No. 2,382,010, issued Aug. 14, 1945, U.S. Pat. No. 5,273,653, issued Dec. 28, 1993, U.S. Pat. No. 5,632,896, issued May 27, 1997, U.S. Pat. No. 4,235,561, issued Nov. 25, 1980, U.S. Pat. No. 4,908,129, issued Mar. 13, 1990, and U.S. Pat. No. 4,995,969, issued Feb. 26, 1991.

The above-identified patents do not disclose the apparatus and method described and claimed herein nor do they attain the benefits resulting therefrom.

DISCLOSURE OF INVENTION

The present invention encompasses a method for disposing of wastewater which includes the step of transporting wastewater to an elevated site on a hill having a hillside, at least some of the hillside extending downwardly from the elevated site to a hill bottom.

The method also includes the step of distributing the wastewater transported to the elevated site along a predetermined width of the hillside.

The distributed wastewater flows down the hillside from the elevated site under the influence of gravity so that at least a portion of the hillside is contacted and wetted by the wastewater and wherein the wastewater is absorbed by the hillside.

The rate of distribution of wastewater is controlled so that substantially all the wastewater flowing down the hillside under the influence of gravity is absorbed by the hillside, does not completely penetrate the hill, and does not substantially accumulate at the hill bottom.

The invention also includes apparatus for disposing of wastewater received from a source of wastewater.

The apparatus includes wastewater transporting means for transporting wastewater from the source of wastewater to an elevated site on a hill having a hillside, at least some of the hillside extending downwardly from the elevated site.

Wastewater distributing means is provided for distributing the wastewater transported to the elevated site along a predetermined width of the hillside whereby the distributed water flows down the hillside from the elevated site under the influence of gravity, contacts at least a portion of the hillside, wets the hillside and is absorbed by the hillside.

The apparatus also includes control means for controlling the rate of distribution of wastewater so that substantially all the wastewater flowing down the hillside under the influence of gravity from the elevated site is absorbed by the hillside, does not completely penetrate the hill, and does not substantially accumulate at the hill bottom.

Other features, advantages, and objects of the present invention will become apparent with reference to the following description and accompanying drawings.

MODES FOR CARRYING OUT THE INVENTION

Figure 2:
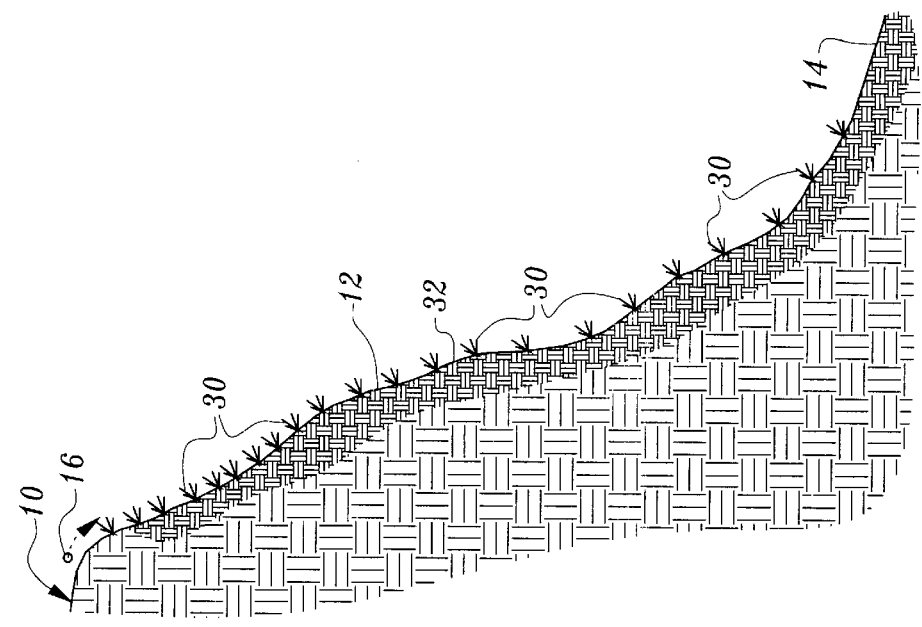
FIG. 2 is a cross-sectional view illustrating a portion of the hill and hillside utilized to dispose of wastewater during operation of the apparatus shown in FIG. 1.
Figure 1:
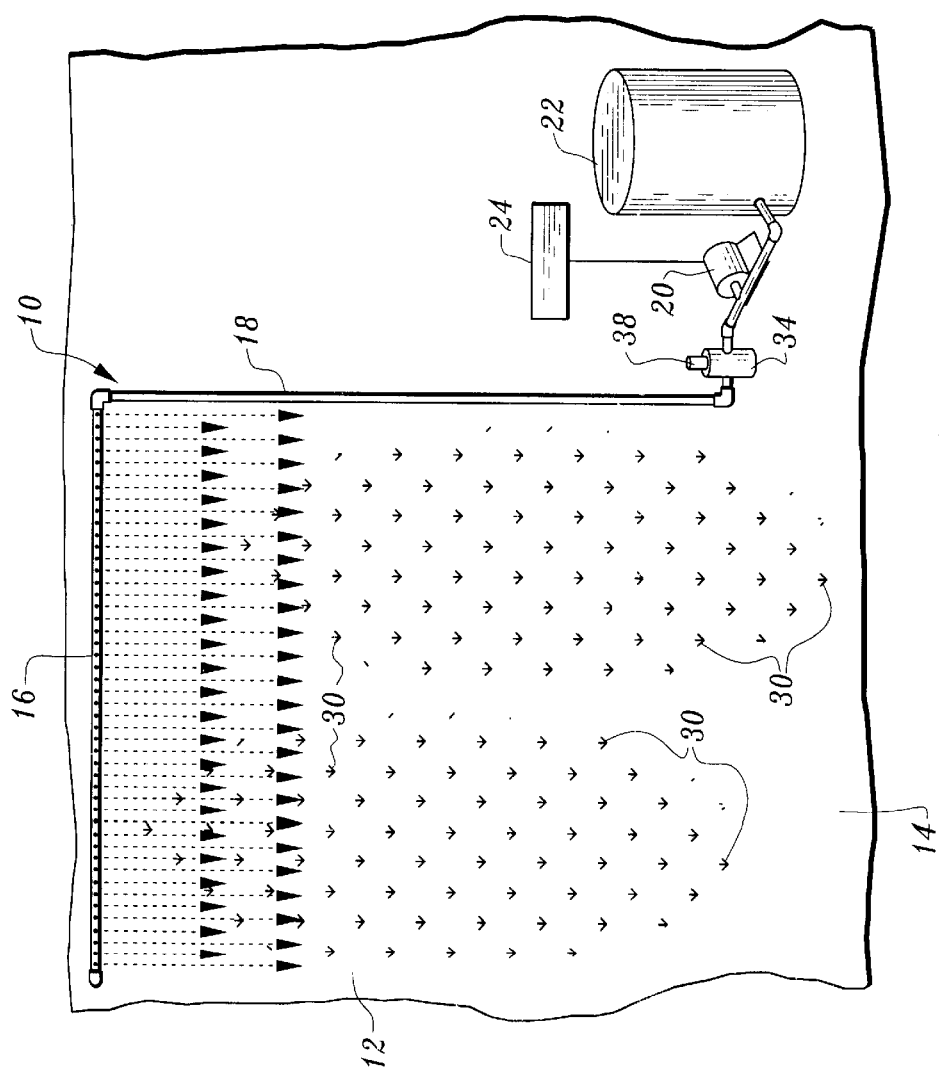
FIG. 1 is a schematic, perspective view illustrating apparatus constructed in accordance with the teachings of the present invention disposed at a hillside.

Referring now to FIGS. 1 and 2, apparatus constructed in accordance with the teachings of the present invention is illustrated, the apparatus being utilized to deliver wastewater to an elevated site on a hill 10 (only a portion of which is shown) having a hillside 12 and a hill bottom 14. For example, the hill could be one of the many hills having open hillsides in areas with desert or semi-desert climates. In some locations, such as the East San Francisco Bay Area and parts of the Central Valley in California, large expanses of these open hillsides surround populated areas. The arid scrub lands of the hillsides are not suitable for grazing by cattle or many other types of domesticated animals.

Disposed at an elevated site on the hill 10 is a conduit 16 having a plurality of fluid discharge outlets for discharging wastewater onto a predetermined width of the hillside. In the arrangement illustrated, these fluid discharge outlets merely comprise openings formed in the conduit. Wastewater discharged therefrom flows down the hillside from the elevated site under the influence of gravity as depicted by the dash lines with arrow heads shown in FIG. 1.

The conduit 16 receives wastewater from a pipe 18 which is connected to the outlet of a pump 20. Pump 20 pumps wastewater from a source thereof such as wastewater tank 22 up to conduit 16.

An important aspect of the present invention is that the wastewater is pumped to the conduit and discharged from the conduit at a controlled rate so that the soil of the hillside below the conduit 16 is wetted to a relatively shallow depth, for example the top several inches of soil, to prevent puddling or channeling. That is, the rate of distribution of wastewater is controlled so that substantially all the wastewater flowing down the hillside under the influence of gravity is absorbed by the hillside, does not completely penetrate the hill, and does not substantially accumulate at the hill bottom. A number of means may be employed to accomplish this. For example, pump 20 may be a variable speed pump operatively associated with a controller 24 to vary the speed of the pump in accordance with sensed or observed hillside conditions during the wastewater distribution process. At least a portion of the hillside is contacted and wetted by the wastewater flowing down the hill and the wastewater is absorbed by the hillside.

Another aspect of the present invention is the use of plants to perform soil stabilization and to phytoremediate contaminants in the wastewater flowing down the hillside under the influence of gravity. Representative plants are shown in FIGS. 1 and 2, some representative plants being designated by reference numeral 30.

Regarding the phytoremediation process, the roots of large green plants can absorb water and the plants can move copious amounts of water through their roots and into the plant body. This water is evaporated from the leaves as pure water vapor—a process called transpiration. Contaminates taken up with the water are degraded, metabolized and/or stored in the plant body. These contaminates may include, for example, salt, organics and heavy metals.

Plantings can be selected to handle specific problems in particular areas. It may be appropriate, for example, to use grasses on the upper slopes, with trees such as Poplar at the base of the slope or hillside, to take up any wastewater reaching the bottom of the slope, promote transpiration, and prevent puddling or runoff. Selected plants, some genetically engineered, have been used in the following phytoremediation processes:

Phytodegradation—Various environmental toxins have been converted to harmless materials such as carbon dioxide and water, by plant induced enzymes.

Phytoextraction—Heavy metals have been taken up by plants from contaminated soil and water, permitting safe disposal or even recovery.

Phytostabilization—Contaminates have been immobilized to formation of insoluble, non-toxic complexes, by plants.

By way of example, the following specific plants are known to have certain phytoremediation characteristics:

Poplar trees (Populus deltoids XP. Trichocarpa) can live in high levels of trichloroethylene (TCE). They metabolize TCE and transpire water.

Petroleum hydrocarbons have been phytoremediated by grasses, including Bermuda, Fescue and Clover.

Alfalfa has been used to phytoremediate polynuclear aromatic hydrocarbons (PAHs), (e.g. pyrene and benzo(a) pyrene).

Alfalfa has been used to remove nickel and copper from solution.

Peat moss (Canadian Sphagnum peat moss) has been used to remove copper.

In FIG. 2 the wetted area of the hillside 12 is designated by reference numeral 32. The root structures of the plants on the hillside are contacted by wastewater in this area and the plants provide for the phytoremediation process, such plants having been selected and planted in accordance with the nature of the wastewater contaminates to be absorbed and treated by the plants. Also, as stated above, the plants through their root structure stabilize the hillside soil to resist erosion of the soil by the distributed wastewater flowing down the hillside under the influence of gravity.

The apparatus illustrated in FIG. 1 also includes a filter and treatment unit 34 which can be employed to filter solids from the wastewater prior to distribution of the wastewater by conduit 16. Unit 34 may also be utilized to add components such as fertilizer to the wastewater through an inlet 38.

The process of this invention can be utilized to ensure aerobic conditions throughout the treatment and disposal of the wastewater. This will prevent odors and provide treatment of the wastewater, including aerobic bacterial treatment, and adsorption of certain components on soil particles. This approach can be utilized to provide a virtually continuous supply of lush vegetation which can be made available for cattle and other animals, thus converting unused or under-used terrain into premium grazing areas.

Figure 4:
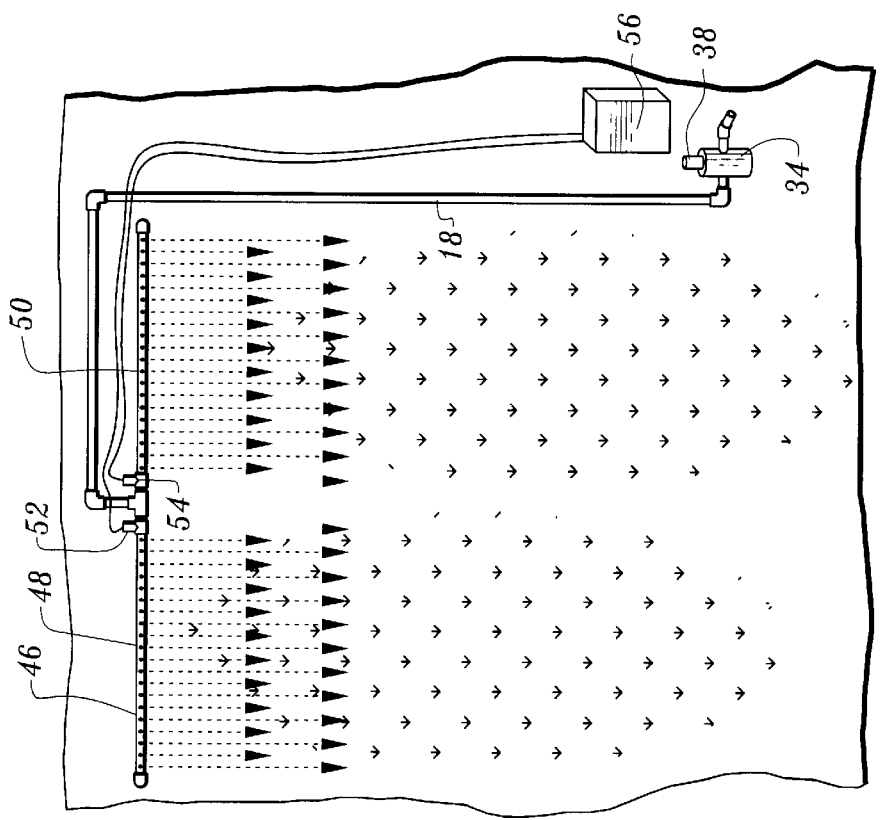
FIG. 4 is a view similar to FIGS. 1 and 3 but illustrating yet another embodiment of the invention.
Figure 3:
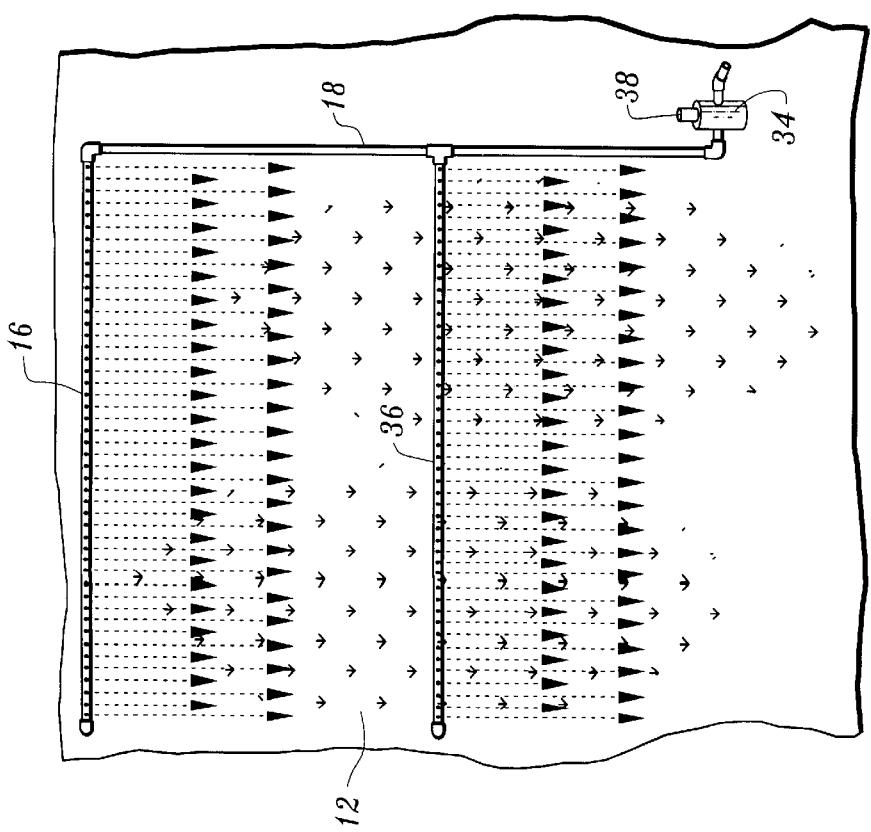
FIG. 3 is a view similar to FIG. 1 but illustrating an alternate embodiment of the invention.

FIGS. 3 and 4 illustrate alternative embodiments of the invention. In the interest of simplicity, the pump, controller and wastewater supply have not been illustrated in these particular figures.

In FIG. 3 pipe 18 is connected to two parallel conduits extending across a segment of the hillside 12, the conduits being identified by reference numerals 16 and 36. These conduits are disposed at two different elevated sites on the hillside, one elevated site being disposed below the other. The wastewater is distributed by conduits 16, 36 from both of the elevated sites.

In FIG. 4 there is only one conduit, conduit 46, connected to pipe 18. Conduit 46 is divided into conduit segments 48, 50. Valves 52, 54 are deployed between the conduit segments so that the flow of wastewater to each conduit segment may be turned on or off. A valve controller 56 controls this action. Using the arrangement shown in FIG. 4, two hillside segments disposed adjacent to one another in a horizontal direction can have wastewater selectively and alternatively distributed to them. Alternatively, of course, both conduit segments may be in or out of fluid flow communication with the pipe 18 at the same time, if desired.

As pointed out above, wastewater is disposed of by plants located on the hillside below the elevated sites where distribution of the wastewater occurs. Not only is the wastewater evaporated by passing through the plants, some evaporation occurs on the hillside during the step of flowing the distributed wastewater down the hillside under the influence of gravity in the spaces between the plants.

The system disclosed herein is relatively low cost. Not only does the system provide green hills in arid areas which are aesthetically pleasing and useful, fire hazard is reduced. Lush cattle feed areas (grasses, alfalfa, etc.) can be created which are alternately established and then grazed by cattle allowed access to them.

Figure 5:
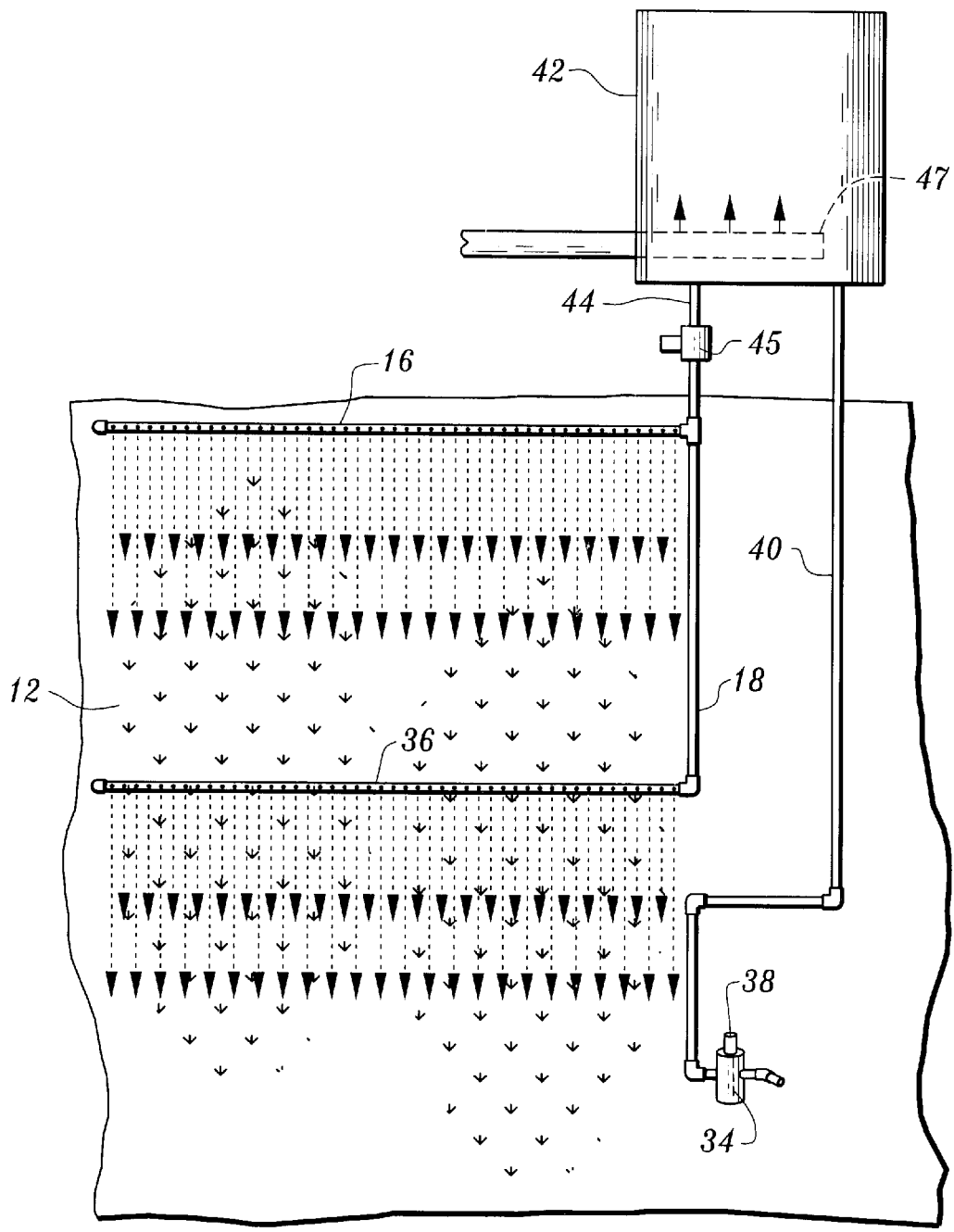
FIG. 5. Is a view similar to FIG. 3 but illustrating one additional embodiment of the invention.

FIG. 5 illustrates an embodiment of the invention having the general layout of the FIG. 3 embodiment. However, in the embodiment of FIG. 5 wastewater is pumped by pump 34 through a pipe 40 to an elevated storage tank 42. The tank outlet 44 is connected to pipe 18. A valve 45 is used to control flow of wastewater under the influence of gravity to pipe 18 and conduits 16 and 36. The stored wastewater in tank 42 is aerated by an air sparge 47 to provide mixing and to aerate the wastewater to support aerobic bacterial action and to control odor.

What is claimed is:

1. A method for disposing of wastewater, said method comprising the steps of:

transporting wastewater to an elevated site on a hill having a hillside, at least some of said hillside extending downwardly from said elevated site to a hill bottom;

distributing the wastewater transported to said elevated site along a predetermined width of said hillside;

flowing the distributed wastewater down said hillside from said elevated site under the influence of gravity so that at least a portion of the hillside is contacted and wetted by said wastewater and wherein said wastewater is absorbed by said hillside; and controlling the rate of distribution of wastewater so that substantially all the wastewater flowing down the hillside under the influence of gravity is absorbed by said hillside, does not completely penetrate said hill, and does not substantially accumulate at the hill bottom.

2. The method according to claim 1 additionally comprising the step of evaporating the distributed wastewater during the step of flowing the distributed wastewater down the hillside under the influence of gravity.

3. The method according to claim 1 additionally comprising the step of planting plants on said hillside below the elevated site, root structure of said plants being contacted by wastewater flowing down the hillside under the influence of gravity.

4. The method according to claim 3 wherein the plants planted during said planting step are selected to phytoremediate contaminants in wastewater flowing down the hillside under the influence of gravity.

5. The method according to claim 3 including the step of absorbing wastewater flowing down the hillside under the influence of gravity into root structure of said plants.

6. The method according to claim 3 including the step of utilizing said plants to stabilize hillside soil to resist erosion of the soil by the flow of distributed wastewater down the hillside under the influence of gravity.

7. The method according to claim 2 wherein said step of evaporating the distributed wastewater is at least partially carried out by passing the wastewater through plants on said hillside below the elevated site.

8. The method according to claim 1 wherein said width of hillside includes a plurality of hillside segments disposed adjacent to one another in a horizontal direction, said step of distributing wastewater including selectively and alternatively distributing said wastewater to said hillside segments.

9. The method according to claim 1 wherein said transporting step including transporting wastewater to first and second elevated sites on a hill, said second elevated site being disposed below said first elevated site on said hillside, said distributing step comprising distributing the wastewater from both said first elevated site and said second elevated site.

10. The method according to claim 9 wherein the wastewater is simultaneously distributed from said first and second elevated sites.

11. The method according to claim 1 including the step of filtering solids from said wastewater prior to said distribution step.

12. The method according to claim 1 including the step of introducing one or more additives into said wastewater prior to said distribution step.

13. The method according to claim 1 wherein the distributed wastewater is employed to create lush cattle feed areas.

14. The method according to claim 13 wherein said cattle feed areas are alternately established and grazed by cattle.

15. Apparatus for disposing of wastewater received from a source of wastewater, said apparatus comprising, in combination:

wastewater transporting means for transporting wastewater from said source of wastewater to an elevated site on a hill having a hillside, at least some of said hillside extending downwardly from said elevated site to a hill bottom;

wastewater distributing means for distributing the wastewater transported to said elevated site along a predetermined width of said hillside whereby the distributed water flows down the hillside from said elevated site under the influence of gravity, contacts at least a portion of the hillside, wets said hillside and is absorbed by said hillside; and control means for controlling the rate of distribution of wastewater so that substantially all the wastewater flowing down the hillside under the influence of gravity from said elevated site is absorbed by said hillside, does not completely penetrate said hill, and does not substantially accumulate at the hill bottom.

16. The apparatus according to claim 13 wherein said wastewater transporting means includes a pipe disposed between said source of wastewater and said elevated site and a pump for pumping wastewater through said pipe from said source of wastewater to said elevated site.

17. The apparatus according to claim 16 wherein said wastewater distributing means includes a conduit connected to said pipe and extending along a predetermined width of said hillside, said conduit having a plurality of fluid discharge outlets for discharging wastewater onto said predetermined width of hillside.

18. The apparatus according to claim 16 wherein said pump comprises a variable speed pump, said control means controlling the speed of said variable speed pump.

19. The apparatus according to claim 15 wherein said wastewater distributing means comprises a plurality of conduits having fluid discharge outlets, said apparatus including means for selectively and alternatively introducing wastewater into the conduits of said plurality of conduits.

20. The apparatus according to claim 15 wherein said wastewater distributing means comprises a plurality of conduits having fluid discharge outlets, said conduits being disposed at different elevations on said hillside.

21. The apparatus according to claim 20 wherein one of said conduits is disposed on the hillside below another of said conduits.

22. The apparatus according to claim 15 additionally comprising means for introducing additives into said wastewater prior to distribution of said wastewater.

23. The apparatus according to claim 15 additionally comprising a storage tank located at said elevated site for temporarily storing said wastewater before distributing the wastewater.

24. The apparatus according to claim 23 additionally comprising aerating means for aerating wastewater in said storage tank.

* * * * *